United States Patent
Na

(10) Patent No.: US 9,287,980 B2
(45) Date of Patent: Mar. 15, 2016

(54) DEVICE OF OPTICAL PASSIVE REPEATER USED IN OPTICAL MULTIMODE COMMUNICATION

(71) Applicant: National Tsing Hua University, Hsinchu (TW)

(72) Inventor: Yun-Chung Na, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 110 days.

(21) Appl. No.: 14/340,884

(22) Filed: Jul. 25, 2014

(65) Prior Publication Data

US 2015/0071631 A1 Mar. 12, 2015

(30) Foreign Application Priority Data

Sep. 12, 2013 (TW) .............................. 102133062 A

(51) Int. Cl.
| | |
|---|---|
| H04B 10/12 | (2006.01) |
| H04B 10/00 | (2013.01) |
| H04B 10/2581 | (2013.01) |
| H04B 10/291 | (2013.01) |
| H04J 14/04 | (2006.01) |

(52) U.S. Cl.
CPC .......... *H04B 10/2581* (2013.01); *H04B 10/291* (2013.01); *H04J 14/04* (2013.01)

(58) Field of Classification Search
CPC .................................................. H04B 10/2581
USPC .................................................. 398/143, 180
See application file for complete search history.

(56) References Cited

U.S. PATENT DOCUMENTS

| | | | | | |
|---|---|---|---|---|---|
| 5,003,623 | A | * | 3/1991 | Asawa | H04B 10/2581 398/143 |
| 5,416,862 | A | * | 5/1995 | Haas | G02B 6/24 385/27 |
| 5,659,644 | A | * | 8/1997 | DiGiovanni | G02B 6/4215 359/341.33 |
| 7,289,698 | B2 | * | 10/2007 | Deliwala | G02B 6/1228 385/123 |
| 8,428,470 | B2 | * | 4/2013 | Futami | B82Y 20/00 359/342 |
| 8,498,318 | B2 | * | 7/2013 | Malpuech | 372/43.01 |
| 8,748,219 | B2 | * | 6/2014 | Tischler | H01S 3/0627 257/40 |
| 2010/0271689 | A1 | * | 10/2010 | Jasapara | H04B 10/2581 359/341.1 |
| 2015/0043910 | A1 | * | 2/2015 | Koebele | H04J 14/04 398/44 |

OTHER PUBLICATIONS

Schneider, et al., An electrically pumped polariton laser, May 2013, Macmillan Publishers Limited, Nature, vol. 497, pp. 348-352.*
Richard et al., Exciton-Polariton Bose-Einstein Condensation: Advances and Issues, 2009, Inderscience Enterprise Ltd., pp. 1-15.*

* cited by examiner

Primary Examiner — Ken Vanderpuye
Assistant Examiner — Jai Lee
(74) Attorney, Agent, or Firm — Jackson IPG PLLC; Demian K. Jackson

(57) ABSTRACT

An optical passive repeater is provided. The repeater is operated under a state of polariton Bose-Einstein condensation (BEC). A phase transition from a thermal polariton state to a condensed polariton state is controlled, where system temperatures and densities are lower than thermal dissociation temperatures and nonlinear saturation densities, respectively. Original input multimode laser signals are transformed into final output single-mode laser signals. Thus, the polariton BEC passive repeater becomes a power-efficient and low-cost device to increase the reach of optical links without sacrificing its signal quality and integrity.

10 Claims, 4 Drawing Sheets

DEVICE OF OPTICAL PASSIVE REPEATER USED IN OPTICAL MULTIMODE COMMUNICATION

TECHNICAL FIELD OF THE INVENTION

The present invention relates to optical multimode communications; more particularly, relates to an optical passive repeater operated in a state of polariton Bose-Einstein condensation (BEC) for converting multimode laser signals into single-mode laser signals, where a phase transition from a thermal polariton state to a condensed polariton state is controlled with the system temperatures and densities lower than the thermal dissociation temperatures and nonlinear saturation densities.

DESCRIPTION OF THE RELATED ART

In Ethernet, due to limitation of physical wire, the distance for transmitting optical signals between two terminals are at most only about 100 meters. Therefore, a link between two terminals, such as between a local host and a remote host, or links between a series of Ethernets, often require additional repeaters to increase the reach of optical links.

Conventionally, digital signal processor (DSP) is used as a repeater. As shown in FIG. 4, the DSP processes input multimode fiber signals by digital electronics. The complex multimode fiber signals are almost exactly transformed into output single-mode fiber signals, to reduce the modal dispersion and, thus, increase the signal transmission distance. However, the power consumption and cost of DSPs are considerably high due to the active-component nature of a DSP. As a result, such an approach cannot provide a cost-effective solution to increase the reach of optical links in data centers, not to mention further applications such as optical interconnects in mass consumer markets. Hence, the prior art does not fulfill all users' requests on actual use.

SUMMARY OF THE INVENTION

The main purpose of the present invention is to convert original input multimode laser signals into final output single-mode laser signals to increase the reach of multimode optical links, by controlling a phase transition from a thermal polariton state to a condensed polariton state to form a polariton BEC in a passive fashion where the system temperatures and densities are lower than the thermal dissociation temperatures and nonlinear saturation densities.

Another purpose of the present invention is to provide a power-efficient and low-cost (1) data-center optical links; and (2) mass-consumer-market optical interconnects with long reach, by using a polariton BEC passive repeater without sacrificing quality and integrity when optical signals are transmitted.

To achieve the above purpose, the present invention is a device of optical passive repeater used in optical multimode communication, comprising a vertical cavity surface emitting laser (VCSEL), a polariton BEC passive repeater and a photodetector (PD), where the VCSEL generates multimode laser signals that enter into a first multimode fiber; the repeater is connected to the VCSEL through the first multimode fiber; the repeater converts the multimode laser signals into single-mode laser signals that enter into a second multimode fiber; the PD is connected to the polariton BEC passive repeater through the second multimode fiber; and the PD senses the final laser signals. Accordingly, a novel device of optical passive repeater used in optical multimode communication is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the schematic view showing the preferred embodiment according to the present invention;

DESCRIPTION OF THE PREFERRED EMBODIMENT

The following description of the preferred embodiment is provided to understand the features and the structures of the present invention.

Figure 1:
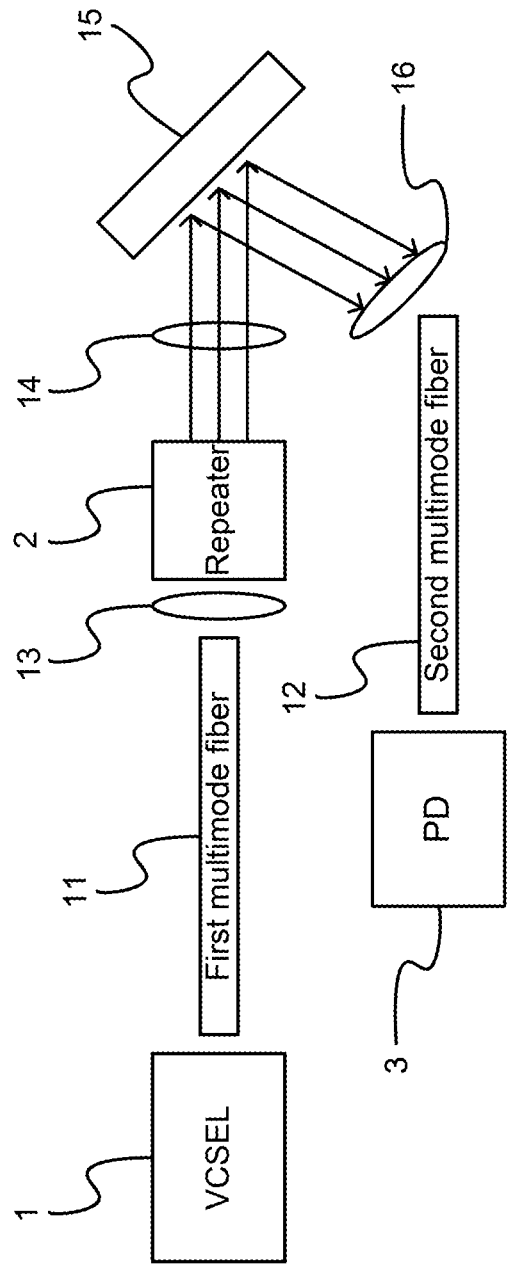

Please refer to FIG. 1, which is a schematic view showing a preferred embodiment according to the present invention. As shown in the figure, the present invention is a device of optical passive repeater used in optical multimode communication, comprising a vertical cavity surface-emitting laser (VCSEL) 1, a polariton BEC passive repeater 2 and a photodetector (PD) 3.

The VCSEL is used for generating multimode laser signals and the multimode laser signals are injected into a first multimode fiber 11.

The polariton BEC passive repeater 2 is connected to the VCSEL 1 through the first multimode fiber 11 and a first lens 13 to convert input multimode laser signals, which are emitted from the VCSEL 1 and injected into the first multimode fiber 11 and focused by the first lens 13, into output single-mode laser signals via a polariton BEC. A second lens 14 collects and collimates the single-mode laser signals.

Since the temporal pulse widths of the single-mode laser signals may need to be adjusted, a grating or fiber-based compressor (or stretcher) with negative dispersion (positive dispersion) is inserted after the second lens 14 given the first multimode fiber 11 has a positive dispersion. Then, the compressed (or stretched) single-mode laser signals are focused by a third lens 16 and injected into a second multimode fiber 12. The PD 3 is connected to the compressor (or stretcher) 15 through the second multimode fiber 12 and the third lens 16 to sense the final laser signals.

Thus, a novel device of optical passive repeater used in optical multimode communication is obtained.

Figure 2:
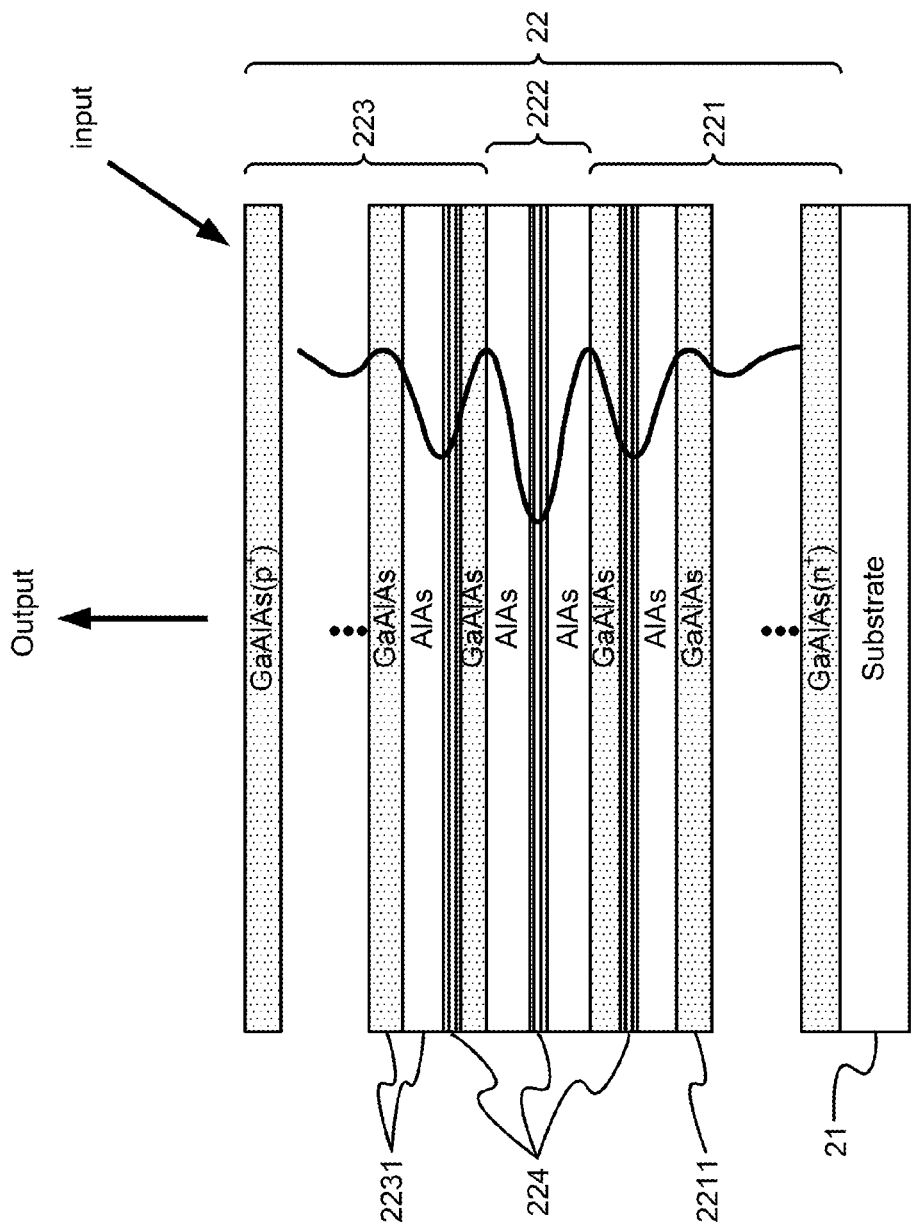
FIG. 2 is the cross-sectional view showing the microcavity structure of the polariton BEC passive repeater.

Please refer to FIG. 2, which is a cross-sectional view showing a microcavity structure of a polariton BEC passive repeater. As shown in the figure, a microcavity structure comprises a substrate 21 and a polariton cavity 22 on the substrate 21. The polariton cavity 22 has a p-n junction and comprises a first Bragg reflector 221 on the substrate 21; a half-wavelength ($\lambda/2$ plus a integer multiple of $\lambda$) cavity 222 on the first Bragg reflector 221; a second Bragg reflector 223 on the half-wavelength cavity 222; and a quantum-well part 224 distributed in the first Bragg reflector 221, the half-wavelength cavity 222 and the second Bragg reflector 223. The first Bragg reflector 221 comprises a plurality of alternating coatings of aluminum arsenide (AlAs) and gallium aluminum arsenide (GaAlAs) to form a plurality of pairs of quarter-wavelength (λ/4) GaAlAs/AlAs alternating coatings 2211. The half-wavelength cavity 222 comprises a plurality of AlAs layers. The second Bragg reflector 223 comprises a plurality of alternating coatings of GaAlAs and AlAs to form a plurality of pairs of λ/4 AlAs/GaAlAs alternating coatings 2231. The quantum-well part 224 has multiple quantum wells sitting at microcavity electric field antinodes, and can be GaAlAs quantum wells, gallium arsenide (GaAs) quantum wells, indium gallium arsenide (InGaAs) quantum wells, or indium arsenide (InAs) quantum wells.

The polariton cavity 22 has a $n^+$ doped layer and a $p^+$ doped layer. The $n^+$ doped layer is a most-bottom coating layer adjacent to the substrate 21 and the $p^+$ doped layer is a most-top coating layer corresponding to the most-bottom coating layer. Or, the $p^+$ doped layer is the most-bottom coating layer adjacent to the substrate 21 and the $n^+$ doped layer is the most-top coating layer corresponding to the most-bottom coating layer. The $n^+$ and $p^+$ regions may also exist in the first Bragg reflector 221 and the second Bragg reflector 223 without touching the quantum well part 224 to avoid performance degradation of the polariton BEC passive repeater 2. A forward (or reverse) bias applied on the p-n junction can further provide an optical gain (attenuation) to the multimode-to-single-mode laser signal conversion process.

On using the present invention, multimode laser signals are inputted into the microcavity structure at an oblique angle such as a 45 degree (°) angle (indicated by an arrow in FIG. 2), and then being absorbed to excite thermal polaritons. The thermal polaritons subsequently become condensed polariton if the polariton phase transition occurs (to be disclosed in the next paragraph), and eventually decay to re-emit single-mode laser signals due to the spontaneous phase coherence inherited from polariton BEC. Through the polariton cavity 22, multimode laser signals are converted into single-mode laser signals outputted at a nearly vertical angle such as a 0° angle (indicated by an arrow in FIG. 2) via polariton BEC.

Figure 3:
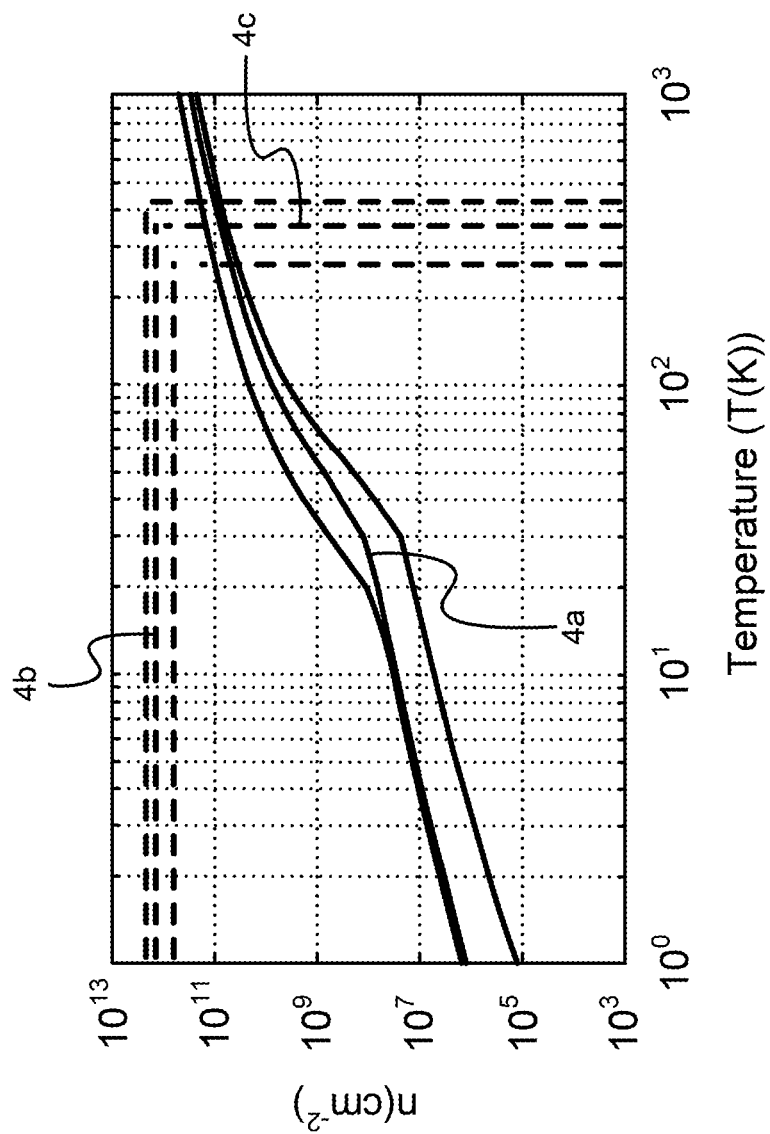
FIG. 3 is the plot showing design considerations for controlling the polariton phase transition.
Figure 4:
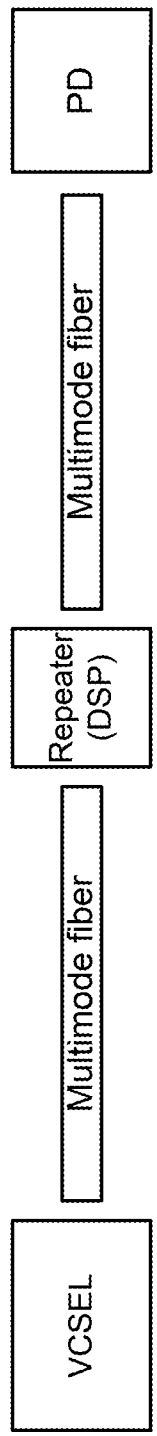
FIG. 4 is the view of the prior art.

Please refer to FIG. 3, which is a plot showing design considerations for controlling a polariton phase transition. As shown in the figure, solid curves show a phase transition crossover from a thermal polariton state (high temperature, low density) to a condensed polariton state (low temperature, high density). Horizontal dashed lines 4b show polariton nonlinear saturation densities. Vertical dashed lines 4c show polariton thermal dissociation temperatures. Three sets of curves are calculated according to three different microcavity designs. By operating the system temperatures and densities in a region enclosed by an upper part (or left-hand side) of a solid curve 4a (polariton phase transition crossover), a lower part of a horizontal dashed line 4b (polariton nonlinear saturation density), and a left-hand side part of a vertical dashed line 4c (polariton thermal dissociation density), a polariton BEC passive repeater is obtained and original multimode laser signals are converted into final single-mode laser signals. Note that, with an appropriate microcavity design, e.g., the lowest (or the rightmost) solid curve plus the highest horizontal dashed line plus the rightmost vertical dashed line, a room temperature operation can be obtained.

To sum up, the present invention is a device of optical passive repeater used in optical multimode communication, where the device is operated at a polariton BEC state to control a phase transition from a thermal polariton state to a condensed polariton state with system temperatures and densities below thermal dissociation temperatures and nonlinear saturation densities, respectively, for converting original multimode laser signals into final single-mode laser signals; and, thus, a power-efficient and low-cost optical link with long reach is provided by using a disclosed polariton BEC passive repeater.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A device of optical passive repeater used in optical multimode communication, comprising
    a vertical cavity surface emitting laser (VCSEL),
        wherein said VCSEL generates multimode laser signals and said multimode laser signals enter into a first multimode fiber;
    a polariton Bose-Einstein condensation (BEC) passive repeater, said polariton BEC passive repeater being connected to said VCSEL through said first multimode fiber,
        wherein said polariton BEC passive repeater converts said multimode laser signals into single-mode laser signals and said single-mode laser signals enter into a second multimode fiber; and
    a photodetector (PD), said PD being connected to said polariton BEC passive repeater through said second multimode fiber,
        wherein said PD senses said final laser signals;
    wherein said polariton BEC passive repeater has a microcavity structure and said microcavity structure comprises
    a substrate; and
    a polariton cavity, said polariton cavity having a p-n junction, said polariton cavity comprising
    a first Bragg reflector, said first Bragg reflector being located on said substrate, said first Bragg reflector having a plurality of alternating coatings;
    a half-wavelength cavity, said half-wavelength cavity being located on said first Bragg reflector;
    a second Bragg reflector, said second Bragg reflector being located on said half-wavelength cavity, said second Bragg reflector having a plurality of alternating coatings; and
    a quantum well part, said quantum well part having multiple quantum wells, said quantum wells being distributed in said first Bragg reflector, said half-wavelength cavity and said second Bragg reflector; and
    wherein said multimode laser signals are inputted to said microcavity structure at an oblique angle; said multimode laser signals are converted into said single-mode laser signals after passing through said polariton cavity; and said single-mode laser signals are outputted at a nearly vertical angle.

2. The device according to claim 1,
    wherein a first lens is inserted between said first multimode fiber and said polariton BEC passive repeater; optical signals pass through said first multimode fiber are focused by said first lens to said polariton BEC passive repeater; and, then, said optical signals are focused to said second multimode fiber by a second lens.

3. The device according to claim 2,
    wherein a device selected from a group consisting of a grating-based or a fiber-based compressor or stretcher is further inserted between said second lens and said second multimode fiber; temporal pulse widths of optical signals are adjusted through said device; and, said optical signals thus obtained are focused to said second multimode fiber by a third lens.

4. The device according to claim 1, wherein said polariton cavity has an $n^+$ doped layer and a $p^+$ doped layer; said $n^+$ doped layer is a most-bottom coating layer adjacent to said substrate; and said $p^+$ doped layer is a most-top coating layer corresponding to said most-bottom coating layer.

5. The device according to claim 1, wherein said polariton cavity has a $p^+$ doped layer and an $n^+$ doped layer; said $p^+$ doped layer is adjacent to a most-bottom coating layer of said substrate; and said $n^+$ doped layer is a most-top coating layer corresponding to said most-bottom coating layer.

6. The device according to claim 1, wherein said first and second Bragg reflectors obtain said alternating coatings by alternately coating aluminum arsenide (AlAs) and gallium aluminum arsenide (GaAlAs).

7. The device according to claim 1, wherein said half-wavelength cavity is obtained by coating with a plurality of layers of a material selected from a group consisting of AlAs and GaAlAs.

8. The device according to claim 1, wherein said quantum well is made of a material selected from a group consisting of GaAlAs, gallium arsenide (GaAs), indium gallium arsenide (InGaAs) and indium arsenide (InAs).

9. The device according to claim 1, wherein said polariton BEC passive repeater is a passive repeater to convert said multimode laser signals into said single-mode laser signals through BEC.

10. The device according to claim 9, wherein said polariton BEC passive repeater controls a phase transition from a thermal polariton state to a condensed polariton state with system temperatures and densities lower than polariton thermal dissociation temperatures and nonlinear saturation densities.

* * * * *